us009860854B2

United States Patent
Bengtsson et al.

(10) Patent No.: US 9,860,854 B2
(45) Date of Patent: Jan. 2, 2018

(54) POWER EFFICIENT CONTROL OF UPLINK CARRIER USAGE BY MOBILE TERMINAL

(71) Applicant: Sony Mobile Communications AB, Lund (SE)

(72) Inventors: Erik Bengtsson, Eslöv (SE); Zhinong Ying, Lund (SE); Rickard Ljung, Helsingborg (SE)

(73) Assignee: Sony Mobile Communications Inc., Tokyo (JP)

( * ) Notice: Subject to any disclaimer, the term of this patent is extended or adjusted under 35 U.S.C. 154(b) by 20 days.

(21) Appl. No.: 14/761,037

(22) PCT Filed: Jan. 15, 2014

(86) PCT No.: PCT/EP2014/050659
§ 371 (c)(1),
(2) Date: Jul. 15, 2015

(87) PCT Pub. No.: WO2014/111400
PCT Pub. Date: Jul. 24, 2014

(65) Prior Publication Data
US 2015/0351047 A1     Dec. 3, 2015

(30) Foreign Application Priority Data

Jan. 16, 2013   (EP) .................................... 13000218

(51) Int. Cl.
*H04W 52/02*     (2009.01)
*H04W 52/26*     (2009.01)
(Continued)

(52) U.S. Cl.
CPC .......... *H04W 52/265* (2013.01); *H04L 5/001* (2013.01); *H04L 43/06* (2013.01); *H04W 24/08* (2013.01);
(Continued)

(58) Field of Classification Search
None
See application file for complete search history.

(56) References Cited

U.S. PATENT DOCUMENTS

2009/0010274 A1*  1/2009  Koskan ............. H04W 72/1205
                                                        370/437
2012/0155407 A1*  6/2012  Lindoff .................... H04L 5/001
                                                        370/329
(Continued)

FOREIGN PATENT DOCUMENTS

EP       2 523 491 A1    11/2012
GB       2 472 978 A      3/2011
WO       2011/135163 A1  11/2011

OTHER PUBLICATIONS

International Search Report and Written Opinion dated Feb. 17, 2014 for corresponding International application No. PCT/EP2014/050659.
(Continued)

*Primary Examiner* — Christopher Crutchfield
(74) *Attorney, Agent, or Firm* — Renner, Otto, Boisselle & Sklar, LLP (57) ABSTRACT

In data transmission between a mobile terminal and a cellular network, a network component, e.g., a base station, establishes a downlink connection from the cellular network to the mobile terminal. The downlink connection uses one or more downlink carriers. Further, the network component identifies multiple uplink carriers which are available for establishing an uplink connection from the mobile terminal to the cellular network. The network component estimates impact of usage of the uplink carriers on power consumption of the mobile terminal. Depending on the estimated impact, the network component selects at least one of the uplink carriers for establishing the uplink connection.

12 Claims, 6 Drawing Sheets

(51) Int. Cl.
    *H04W 72/12*    (2009.01)
    *H04W 72/04*    (2009.01)
    *H04W 24/08*    (2009.01)
    *H04L 12/26*    (2006.01)
    *H04L 5/00*     (2006.01)

(52) U.S. Cl.
    CPC ....... *H04W 52/02* (2013.01); *H04W 52/0209* (2013.01); *H04W 72/0473* (2013.01); *H04W 72/1268* (2013.01)

(56) References Cited

U.S. PATENT DOCUMENTS

| | | |
|---|---|---|
| 2012/0182879 A1 | 7/2012 | Tamura et al. |
| 2012/0243455 A1* | 9/2012 | Feng .................... H04L 5/0037 370/311 |
| 2013/0183792 A1* | 7/2013 | Kudo ................ H01L 27/14698 438/72 |
| 2014/0068307 A1* | 3/2014 | Koskinen .......... H04W 52/0209 713/323 |
| 2014/0092785 A1* | 4/2014 | Song ........................ H04L 1/00 370/280 |

OTHER PUBLICATIONS

Ericsson et al., "Summary of the email discussion [68#23] LTE: CC activation/deactivation"; R2-100079, Jan. 2010.

3$^{rd}$ Generation Partnership Project; Technical Specification Group Radio Access Network; Evolved Universal Terrestrial Radio Access . . . vol. RAN WG1, No. V11.0.0, pp. 1-14, Sep. 2012.

'3$^{rd}$ Generation Partnership Project; Technical Specification Group Radio Access Network; Physical layer; Measurements' vol. RAN WG1, No. V11.0.0, pp. 1-24, Dec. 2011.

* cited by examiner

POWER EFFICIENT CONTROL OF UPLINK CARRIER USAGE BY MOBILE TERMINAL

The present invention relates to a method of selecting an uplink carrier to be used by a mobile terminal and to a correspondingly configured network component.

In cellular networks, efficient usage of available frequency resources is an important aspect. For example, when assuming a certain modulation and coding scheme (MCS) and optionally also Multiple Input Multiple Output format, the available frequency resources determine the achievable bitrates and capacity of the cellular network.

In 3GPP ($3^{rd}$ Generation Partnership Project) cellular networks using LTE (Long Term Evolution) or WCDMA (Wideband Code Division Multiple Access), a concept denoted as "carrier aggregation" or "multi carrier" was introduced. In this case, multiple carriers can be combined to establish a downlink (DL) connection from the cellular network to a mobile terminal, and/or multiple carriers can be combined to establish an uplink (UL) connection from the mobile terminal to the cellular network. These carriers may be located in different bands of the frequency spectrum. By using multiple carriers for establishing the DL connection, the effective bandwidth and achievable bitrate of the DL connection may be increased as compared to a single carrier connection. Similarly, by using multiple carriers for establishing the UL connection the effective bandwidth and achievable bitrate of the UL connection may be increased as compared to a single carrier connection.

The present concepts of combining multiple carriers mainly aim at improving performance of the cellular network, e.g., for providing increased bitrates or increasing capacity of the cellular network. However, there is also a general need for power efficiency of mobile terminals. Increased performance, e.g., in terms of bitrate, may in some cases even adversely affect power efficiency of mobile terminals.

According to an embodiment of the present invention, a method of data transmission between a mobile terminal and a cellular network is provided. According to the method, a DL connection from the cellular network to the mobile terminal is established. The DL connection uses one or more DL carriers. Further, multiple UL carriers which are available for establishing an UL connection from the mobile terminal to the cellular network are identified. Impact of usage of the UL carriers on power consumption of the mobile terminal is estimated. Depending on the estimated impact, the at least one of the UL carriers for establishing the UL connection is selected. In this way, the UL connection may be established using a configuration of one or more UL carriers which offers the lowest impact on the power consumption of the mobile terminal.

According to an embodiment, the steps of the above method may be performed by a network component, e.g., by a base station. In this case, the network component may receive at least one report of measurements performed by the mobile terminal and use the received at least one measurement report as a basis for estimating the impact on the basis of the received at least one measurement report. Alternatively, the steps of the above method could be performed at the mobile terminal, thereby reducing signalling between the mobile terminal and the cellular network.

According to an embodiment, the at least one measurement report indicates, for each of the UL carriers, a transmit power of the mobile terminal.

According to an embodiment, at least two of the UL carriers may be selected for establishing the UL connection.

Depending on the estimated impact, it may then be decided to schedule an UL transmission on one of the at least two UL carriers. In this way, the UL transmission may be scheduled on that one of the UL carriers which offers the lowest impact on the power consumption of the mobile terminal.

According to an embodiment, the UL carriers are received by at least two different base stations of the cellular network. In addition or as an alternative, at least two of the UL carriers are received by the same base station of the cellular network.

According to a further embodiment of the present invention, a method of data transmission between a mobile terminal and a cellular network is provided. According to the method the mobile terminal establishes a DL connection from the cellular network to the mobile terminal. The DL connection uses one or more DL carriers. The mobile terminal identifies multiple UL carriers which are available for establishing an UL connection from the mobile terminal to the cellular network. The mobile terminal measures a transmit power for each of the UL carriers and sends at least one measurement report indicating the measured transmit powers to the cellular network. Such measurement report allows for supporting accurate estimation of the impact of usage of the UL carriers by the mobile terminal.

According to an embodiment, the mobile terminal receives a request for the measurement report from the cellular network and performs the measurement of the transmit powers and/or the sending of the measurement report in response to the request.

According to a further embodiment of the present invention, a network component for a cellular network is provided. The network component comprises an interface for establishing a DL connection to a mobile terminal. The DL connection uses one or more DL carriers. Further, the network component comprises a processor. The processor is configured to identify multiple UL carriers which are available for establishing an UL connection from the mobile terminal to the cellular network, to estimate impact of usage of the UL carriers on power consumption of the mobile terminal and, depending on the estimated impact, select at least one of the UL carriers for establishing the UL connection.

According to an embodiment, the processor is further configured to receive at least one report of measurements performed by the mobile terminal and to estimate the impact on the basis of the received at least one measurement report.

According to an embodiment, the at least one measurement report indicates, for each of the UL carriers, a transmit power of the mobile terminal.

According to an embodiment, the processor is further configured to select at least two of the UL carriers for establishing the UL connection and, depending on the estimated impact, decide to schedule an UL transmission on one of the at least two UL carriers.

The interface of the network component may be a radio interface and is configured for transmitting the at least one DL carrier. This may for example be the case if the network component is a base station of the cellular network or a relay node. The radio interface may also be configured for receiving at least one of the UL carriers.

According to a further embodiment of the present invention, a mobile terminal is provided. The mobile terminal comprises a radio interface for establishing a DL connection from a cellular network to the mobile terminal and for establishing an UL connection from the mobile terminal to the cellular network. The DL connection uses one or more DL carriers. Further, the mobile terminal comprises a processor. The processor is configured to identify multiple UL carriers which are available for establishing the UL connection, to measure a transmit power for each of the UL carriers, and to send at least one measurement report indicating the measured transmit powers to the cellular network.

According to an embodiment, the processor is configured to receive a request for the measurement report from the cellular network and to perform the measurement of the transmit powers and/or the sending of the measurement report in response to the request.

Although specific features described in the above summary and in the following detailed description are described in connection with specific embodiments and aspects, it is to be understood that the features of the embodiments and aspects may be combined with each other unless specifically noted otherwise.

The invention will now be described in more detail with reference to the accompanying drawings.

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

Figure 1:
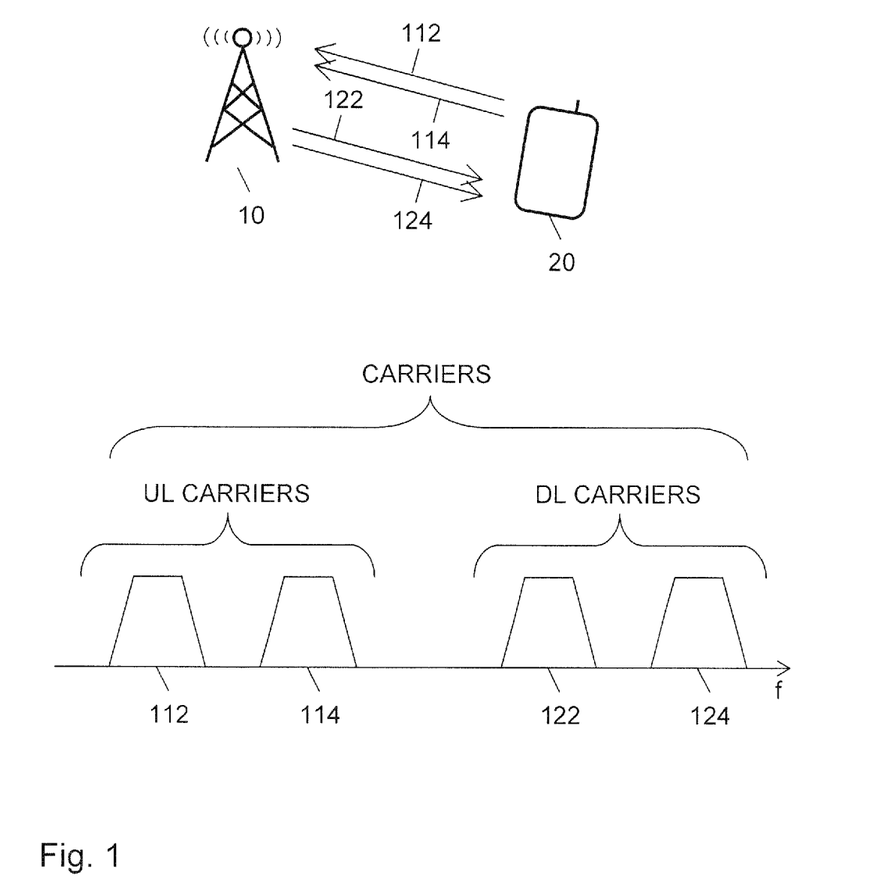
FIG. 1 schematically illustrates aggregation of component carriers as utilized according to an embodiment of the present invention.

FIG. 1 shows an exemplary scenario of data transmission between a cellular network and a mobile terminal 20. In FIG. 1, the cellular network is represented by a base station 10. In the following, it will be assumed that the cellular network implements LTE access technology. Accordingly, the base station 10 may generally correspond to an eNB in accordance with the 3GPP LTE specifications. The mobile terminal 20 may for example be a mobile phone, a tablet computer or some other type of portable computing device, or a data stick.

The base station 10 is assumed to be a serving base station of the mobile terminal 20. That is to say, the base station 10 is assumed to be responsible for controlling operation of the mobile terminal 20 in the cellular network. This may in particular include controlling the establishment of connections between the mobile terminal 20 and the cellular network. Further, this may include scheduling of transmissions between the mobile terminal 20 and the cellular network.

As further illustrated in FIG. 1, carrier aggregation may be utilized when establishing a DL connection from the cellular network to the mobile terminal 20 and/or when establishing an UL connection from the mobile terminal 20 to the cellular network. In the exemplary scenario of FIG. 1, a first UL carrier 112 and a second UL carrier 114 are available for establishing the UL connection, and a first DL carrier 122 and a second DL carrier 124 are available for establishing the DL connection. The first UL carrier 112 and the first DL carrier 122 may be located in a first band of the total available frequency spectrum, and the second UL carrier 114 and the second DL carrier 124 may be located in a second band of the total available frequency spectrum. The first and second band may be non-contiguous and each be composed of a band for UL carriers and a band for DL carriers. As illustrated in FIG. 1, also the band for UL carriers and the band for DL carriers may be non-contiguous. For each band, the DL carriers may each be paired with a corresponding UL carrier. Such pair of DL carrier and corresponding UL carrier may also be referred to as cell. For example, in the scenario of FIG. 1, the first UL carrier 112 could be paired with the first DL carrier 122, and the second UL carrier 114 could be paired with the second DL carrier 124. During cell assignment of the mobile terminal 20, the mobile terminal 20 may be assigned to the pair of DL carrier and corresponding UL carrier.

Figure 2:
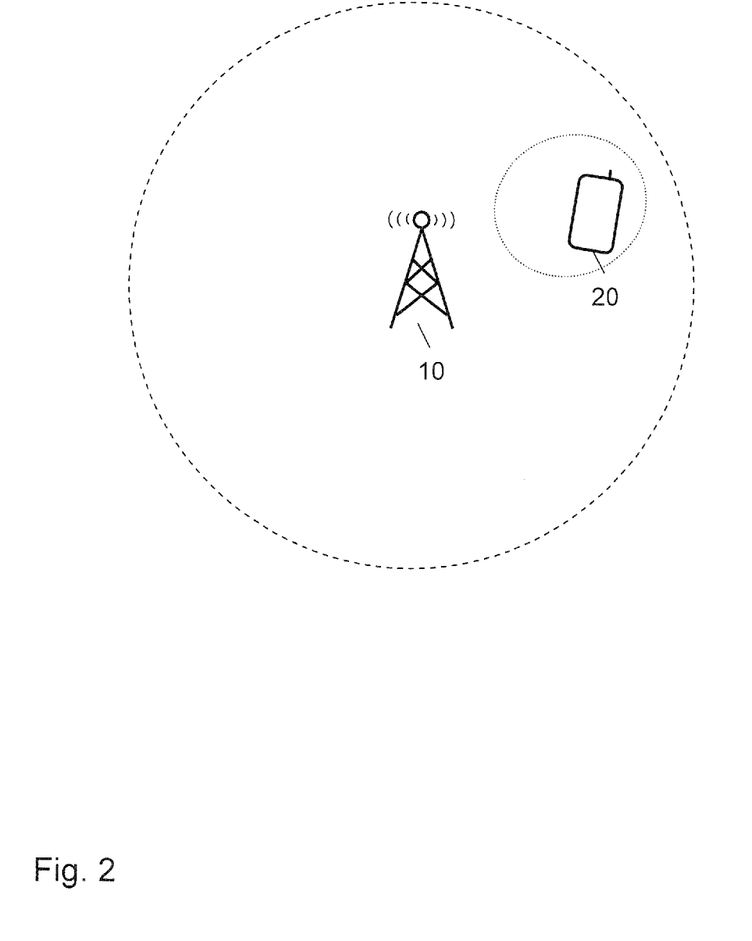
FIG. 2 schematically illustrates exemplary coverage areas of different cells available to a mobile device.

The different cells associated with the different carriers may also have different coverage areas. This is schematically illustrated in FIG. 2. In FIG. 2, the coverage area of the first band is illustrated by a dashed line, whereas the coverage area of the second band is illustrated by dotted lines. The different coverage areas may be due to the first band and or the second band being transmitted by different antenna technologies. Further, the first band and the second band may have different propagation characteristics or may be subject to different interference levels. According to a still further possibility, the DL carriers of the first band and the second band could be transmitted by antennas at different locations or even by different base stations. Similarly, the UL carriers of the first band and the second band could be received by antennas at different locations or even by different base stations. Utilization of carrier aggregation with respect to carriers received or transmitted by different base stations may require cooperation or coordination between the base stations, e.g., via a backhaul connection between the base stations.

In the scenario of FIG. 1, the base station 10 may generally utilize the first DL carrier 122 and/or the second DL carrier 124 for establishing the DL connection from the cellular network to the mobile terminal 20, and the base station 10 may utilize the first UL carrier 112 and/or the second UL carrier 114 for establishing the UL connection from the mobile terminal 20 to the cellular network.

In many usage scenarios, the amount of DL data traffic directed from the cellular network to the mobile terminal 20 is larger than the amount of UL data traffic directed from the mobile terminal 20 to the cellular network, e.g., due to downloading of data such as web content. Such asymmetry has the effect that typically the main performance limitation resides in the DL connection. When utilizing carrier aggregation, this asymmetry may be addressed by combining more DL carriers than UL carriers. For example, in the scenario of FIG. 1, it could be beneficial to combine the DL carriers 122 and 124 for establishing the DL connection to the mobile terminal 20, while utilizing one of the UL carriers 112, 114 for establishing the UL connection.

Accordingly, it is possible to utilize only a part of the available UL carriers 112, 114 for establishing the UL connection and performing UL transmissions. More generally, if the possibility to combine carriers is utilized to a larger extent in the DL than in the UL, more UL carriers may be available to the mobile terminal 20 than needed for establishing the UL connection. Accordingly, there is freedom to select which UL carrier should be used for establishing the UL connection and performing UL transmissions.

According to concepts as explained in the following, the possibility to select between multiple available UL carriers may be utilized for improving power efficiency of the mobile terminal 20. For this purpose, the base station 10 estimates impact of usage of the different available UL carriers on the power consumption of the mobile terminal 20. In view of the estimated impact, the base station 10 may then select one or more of the available UL carriers to be used for establishing the UL connection from the mobile terminal 20 to the cellular network. In particular, it becomes possible to select a configuration of one or more UL carriers which offers the lowest impact on power consumption of the mobile terminal.

For example, when referring to the scenario of FIGS. 1 and 2, selecting the second UL carrier 114 from the second band may be the appropriate selection in view of power efficiency of the mobile terminal 20, e.g., because the mobile terminal 20 is located close to an antenna used for receiving the second UL carrier 14.

For estimating the impact, the base station 10 may use one or measurement reports provided by the mobile terminal 20. The base station 10 may request such measurement reports from the mobile terminal 20 as needed. In response to such request, the mobile terminal 20 may measure, for each of the available UL carriers, the transmit power required for performing an UL transmission on the UL carrier. Such measurements may for example involve a power measurement on an antenna port connector of the mobile terminal, using a measurement frequency window which corresponds to the frequency position and bandwidth of the UL carrier. For performing the measurements, the mobile terminal 20 may be controlled to have a certain minimum transmit activity on all available UL carriers. For example, if all UL carriers can be used simultaneously, the base station may regularly schedule an UL transmission of data on each of the UL carriers. If simultaneous activation of all UL carriers is not possible, the base station 10 may regularly perform control signalling to the mobile terminal 20 to switch between different UL carrier configurations.

The results of such measurements may be provided to the base station 10 in one or more measurement reports, and the base station 10 may evaluate the measurement reports to estimate the impact. The measurement of the transmit powers for individual UL carriers may for example be handled and reported in a similar manner as the measurements specified in 3GPP Technical Specifications 25.215 or 36.214.

Having selected the UL carrier(s), the base station 10 may send an indication to the mobile terminal 20 to configure the mobile terminal 20 to use the selected UL carriers for UL transmissions of data.

In some scenarios, the UL connection may be established using two or more UL carriers. In such cases, also scheduling of UL transmissions may be performed on the basis of the estimated impact. In particular, the base station 10 may decide to schedule a certain UL transmission on the UL carriers estimated to have the lowest impact on power consumption of the mobile terminal 20.

Typically, an UL carrier requiring lower transmit power may be regarded as having the lower impact. However, also more complex considerations may be taken into account. For example, if an UL carrier allows for achieving a significantly higher bitrate, also a higher transmit power on the UL carrier may be acceptable, if this allows for restricting usage of the UL carrier to a smaller time interval.

In some scenarios, the impact on power consumption may also be estimated from other types of measurements. For example, the mobile terminal 20 may perform measurements on the DL carriers. From such measurements, the power impact of the corresponding UL carriers may be deduced. This is possible because in many usage scenarios there is a close correlation between the characteristics of the DL carrier and its corresponding UL carrier. The deduction of the UL carrier characteristics, in particular the power impact of the individual UL carrier, from the measurements on the DL carriers may be performed on the network side, e.g., at the base station 10, using one or more measurement reports on DL carrier characteristics received from the mobile terminal 20. Alternatively, the deduction of the UL carrier characteristics may also be performed at the mobile terminal. In some cases, the measurements could also be performed on the network side. For example, the transmit power of the DL carriers could be measured by the network and be used on the network side for deducing the transmit powers of the corresponding UL carriers.

Figure 3:
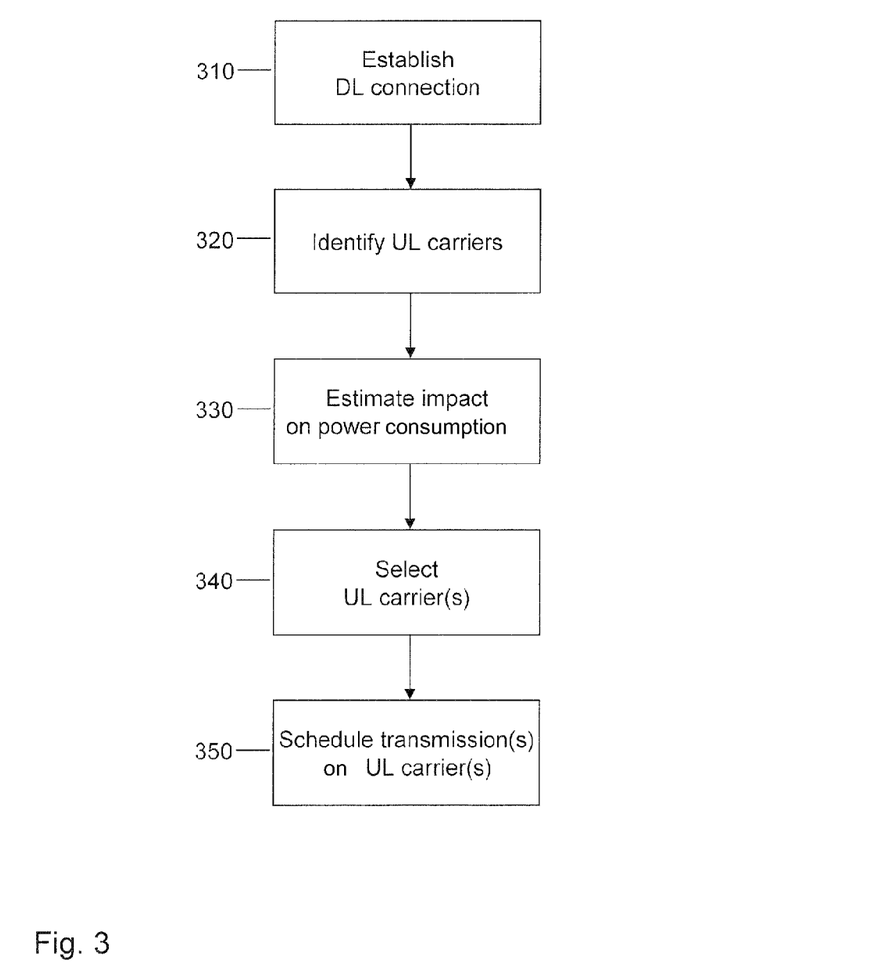
FIG. 3 shows a flowchart for illustrating a method according to an embodiment of the present invention.

FIG. 3 shows a flowchart for illustrating a method of data transmission between a mobile terminal and a cellular network. The method may be used for implementing the above concepts in a network component, e.g., in the base station 10.

At step 310, the network component establishes a DL connection from the cellular network to the mobile terminal. The DL connection may use one or more DL carriers. The DL connection may be established directly from the network component, but may also be established via other network components, e.g., base stations.

At step 320, the network component identifies multiple UL carriers which are available for establishing an UL connection from the mobile terminal to the cellular network.

At step 330, the network component estimates impact of usage of the UL carriers on power consumption of the mobile terminal. For this purpose, the network component may receive one or more measurement reports on measurements performed by the mobile terminal. The measurement reports may then be used as a basis for estimating the impact. The measurement reports may in particular indicate, individually for each UL carrier, the transmit powers of the mobile terminal. The network component may request the measurement report from the mobile terminal.

At step 340, the network component selects at least one of the UL carriers to be used for establishing the uplink connection. This is accomplished depending on the impact estimated at step 330.

In some scenarios, the network component may select at least two of the UL carriers for establishing the UL connection. Depending on the impact estimated at step 330, the network component may then decide on which one of the at least two UL carriers a certain UL transmission should be scheduled.

The UL carriers may be received by the same base station of the cellular network or by different base stations of the cellular network.

Figure 4:
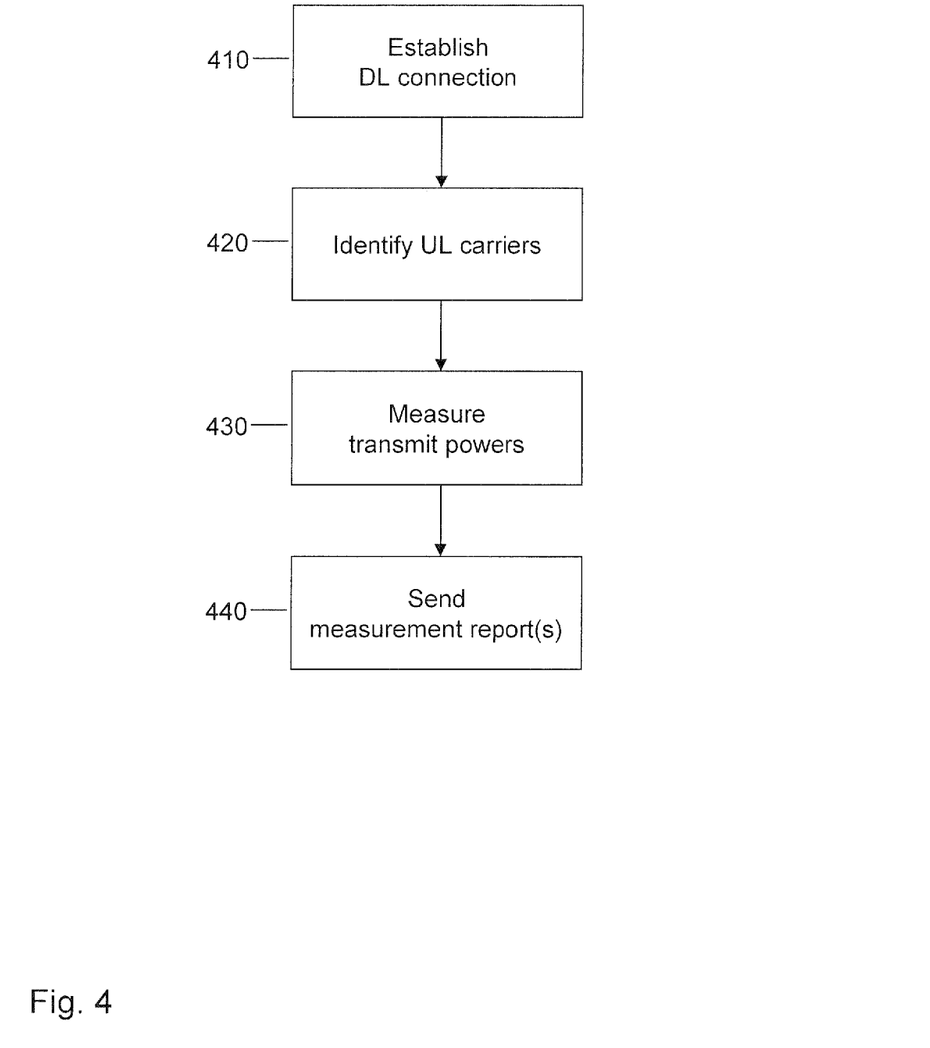
FIG. 4 shows a flowchart for illustrating a further method according to an embodiment of the present invention.

FIG. 4 shows a flowchart for illustrating a method of data transmission between a mobile terminal and a cellular network. The method may be used for implementing the above concepts in the mobile terminal, e.g., in the mobile terminal 20.

At step 410, the mobile terminal establishes a DL connection from the cellular network to the mobile terminal. The DL connection may use one or more DL carriers.

At step 420, the mobile terminal identifies multiple UL carriers which are available for establishing an UL connection from the mobile terminal to the cellular network.

At step 430, the mobile terminal measures its transmit power for each of the UL carriers. These measurements may be repeated periodically. The measurements may also be performed in response to receiving a request for a measurement report from the cellular network.

At step 440 the mobile terminal sends one or more measurement reports to the cellular network. The measurement reports indicate the transmit powers measured at step 430 to the cellular network. In some implementation, a single measurement report may include the measured transmit powers for all UL carriers. In other implementations, the measured transmit powers may be reported in individual measurement reports, e.g., one measurement report per UL carrier.

The methods of FIGS. 3 and 4 may also be combined with each other. In particular, the method of FIG. 4 may be used to provide the measurement report as input of step 330 of FIG. 3, so that the measurement report can be used as a basis for estimating the impact on power consumption of the mobile terminal.

Figure 5:
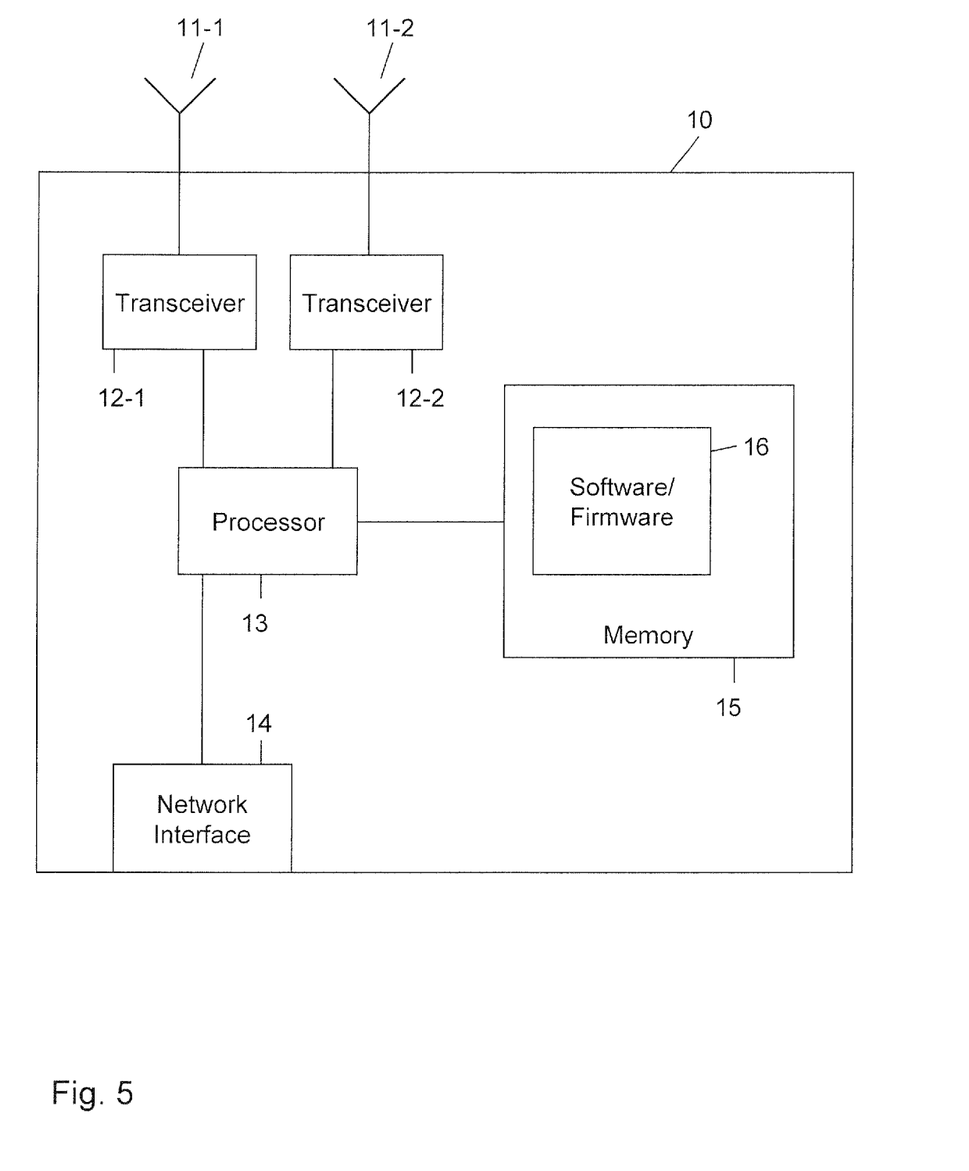
FIG. 5 schematically illustrates a network component according to an embodiment of the present invention.

FIG. 5 shows an exemplary implementation of the base station 10. As illustrated, the base station 10 includes a processor 13 which may be used to implement the above-described functionalities for power-aware selection and usage of one or more UL carriers. For implementing these functionalities, the processor 13 may execute software or firmware 16 stored in a memory 15 of the base station 10. As further illustrated, the base station 10 may also include one or more transceivers 12-1, 12-2 and antennas 11-1, 11-2 for performing DL transmissions on one or more DL carriers and for receiving UL transmissions on one or more UL carriers. The transceivers 12-1, 12-2 and the antennas 11-1, 11-2 may implement a radio interface of the base station. In the illustrated example, the base station is illustrated as being equipped with two transceivers 12-1, 12-2 and antennas 11-1, 11-2, which may be used for independently supporting DL and UL transmission in different bands and/or for supporting MIMO technology. Still further, the base station 10 may be equipped with a network interface 14. The network interface 14 may be used for providing a backhaul connection to other components of the cellular network, e.g., to a data gateway for connecting to the internet or to other base stations.

Figure 6:
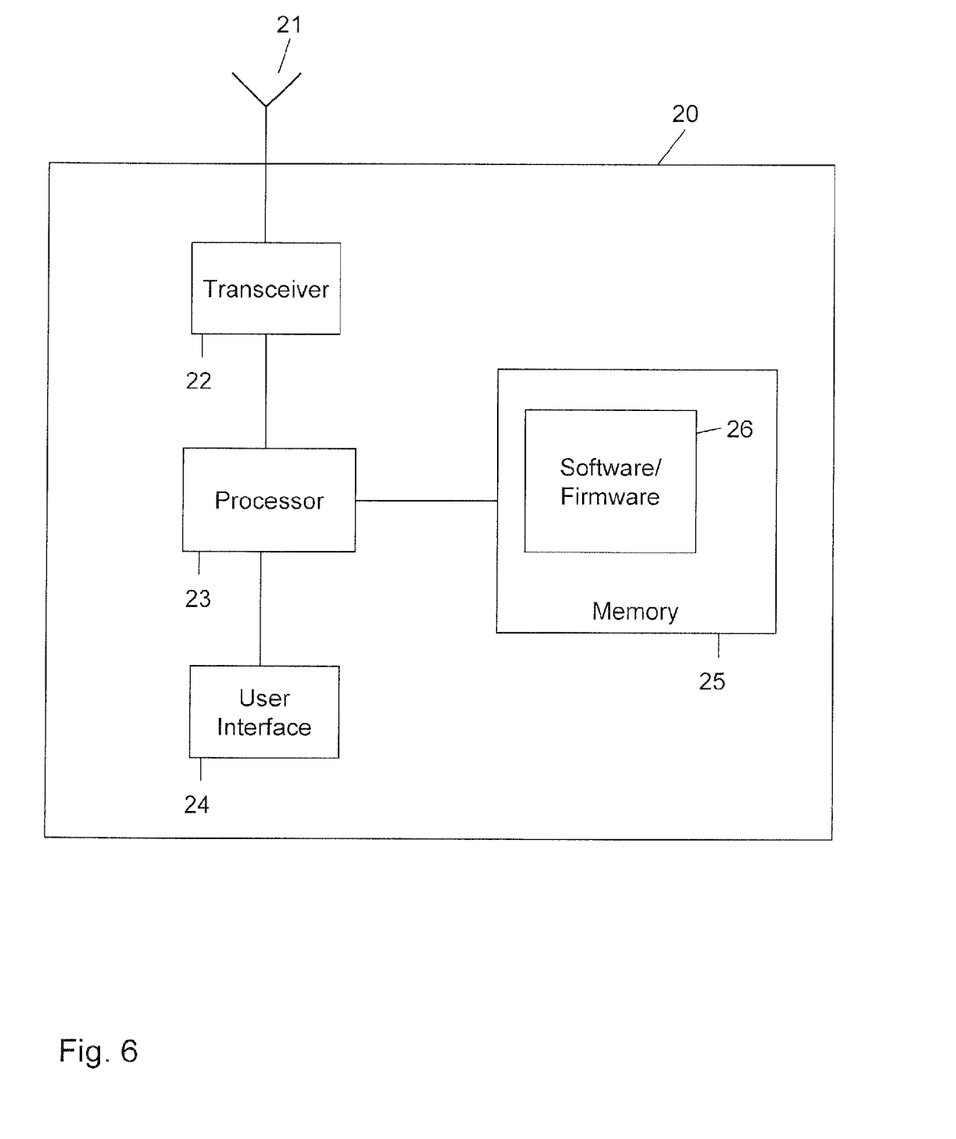
FIG. 6 schematically illustrates a mobile terminal according to an embodiment of the present invention.

FIG. 6 shows an exemplary implementation of the mobile terminal 20. As illustrated, the mobile terminal 20 includes a processor 23 which may be used to implement the above-described functionalities for performing and reporting measurements of transmit power on individual UL carriers. For implementing these functionalities, the processor 23 may execute software or firmware 26 stored in a memory 25 of the mobile terminal 20. As further illustrated, the mobile terminal 20 also includes a transceiver 22 and antenna 21 for receiving DL transmissions on one or more DL carriers and for performing UL transmissions on one or more UL carriers. The transceiver 22 and the antenna 21 implement a radio interface of the mobile terminal 20. In some implementations, the mobile terminal 20 may also be equipped with multiple transceivers and/or multiple antennas, e.g., for supporting MIMO technology.

It is to be understood that the exemplary implementations as described herein are susceptible to various modifications. For example, the concepts could be applied in connection with various types of radio access technologies and for various types of mobile terminals. Also, application of the concepts is not limited to a cellular network supporting carrier aggregation or other types of multi-carrier transmission. Rather, the concepts may also be applied in other scenarios where multiple UL carriers are available for establishing a UL connection. Also, other network components than a base station may be used for implementing the concepts on the cellular network side. For example, a control node could be used for this purpose, e.g., a Radio Network Controller. Also, a relay node could perform implement functionalities as described for the base station. Moreover, although in the illustrated exemplary implementations the evaluation of impact on power consumption and selection of UL carrier(s) is implemented on the network side, other implementations may locate at least a part of such functionalities in the mobile terminal. Still further, in addition to power consumption at the mobile terminal, various other criteria may be taken into account in the illustrated selection processes. Moreover, the concepts may be implemented by dedicated hardware and/or by software to be executed by one or more processors of a network component or a mobile terminal.

The invention claimed is:

1. A method of data transmission between a mobile terminal and a cellular network, the method comprising:
   establishing a downlink connection from the cellular network to the mobile terminal, said downlink connection using one or more downlink carriers;
   identifying multiple uplink carriers which are available for establishing an uplink connection from the mobile terminal to the cellular network;
   a network component sending a request to the mobile terminal, the request triggering measurements of transmit power performed by the mobile terminal while controlling the mobile terminal to have a minimum transmit activity on the uplink carriers;
   in response to the request, the network component receiving at least one report of the measurements performed by the mobile terminal, the at least one report indicating, for each of the uplink carriers, a transmit power being required for performing an uplink transmission on the uplink carrier;
   based on the transmit powers, the network component estimating impact of usage of the uplink carriers on power consumption of the mobile terminal; and
   depending on the estimated impact, selecting at least one of the uplink carriers for establishing the uplink connection.

2. The method according to claim 1, comprising:
   selecting at least two of the uplink carriers for establishing the uplink connection; and
   depending on the estimated impact, the network component deciding to schedule an uplink transmission on one of the at least two uplink carriers.

3. The method according to claim 1,
   wherein the uplink carriers are received by at least two different base stations of the cellular network.

4. The method according to claim 1,
   wherein at least two of the uplink carriers are received by the same base station of the cellular network.

5. A method of data transmission between a mobile terminal and a cellular network, the method comprising:
   the mobile terminal establishing a downlink connection from the cellular network to the mobile terminal, said downlink connection using one or more downlink carriers;
   the mobile terminal identifying multiple uplink carriers which are available for establishing an uplink connection from the mobile terminal to the cellular network;
   the mobile terminal receiving a request for a measurement report from the cellular network
   in response to the request the mobile terminal measuring a transmit power of the mobile terminal for each of the uplink carriers, while the mobile terminal is controlled to have a minimum transmit activity on the uplink carriers, the transmit power being required for performing an uplink transmission on the uplink carrier; and the mobile terminal sending at least one measurement report indicating the measured transmit powers to the cellular network.

6. A network component for a cellular network, the network component comprising an interface for establishing a downlink connection to a mobile terminal, said downlink connection using one or more downlink carriers; and a processor, the processor being configured to:

identify multiple uplink carriers which are available for establishing an uplink connection from the mobile terminal to the cellular network;

send a request to the mobile terminal, the request triggering measurements of transmit power performed by the mobile terminal while controlling the mobile terminal to have a minimum transmit activity on the uplink carriers;

in response to the request, receive at least one report of the measurements performed by the mobile terminal, the at least one report indicating, for each of the uplink carriers, a transmit power being required for performing an uplink transmission on the uplink carrier;

based on the transmit powers, estimate impact of usage of the uplink carriers on power consumption of the mobile terminal; and depending on the estimated impact, select at least one of the uplink carriers for establishing the uplink connection.

7. The network component according to claim 6, wherein the processor is further configured to:

select at least two of the uplink carriers for establishing the uplink connection, and depending on the estimated impact, decide to schedule an uplink transmission on one of the at least two uplink carriers.

8. The network component according to claim 6, wherein the uplink carriers are to be received by at least two different base stations of the cellular network.

9. The network component according to claim 6, wherein at least two of the uplink carriers are to be received by the same base station of the cellular network.

10. The network component according to claim 6, wherein the interface is a radio interface and is configured for transmitting the at least one downlink carrier.

11. The network component according to claim 10, wherein the interface is further configured for receiving at least one of the uplink carriers.

12. A mobile terminal, comprising:

a radio interface for establishing a downlink connection from a cellular network to the mobile terminal, said downlink connection using one or more downlink carriers, and for establishing an uplink connection from the mobile terminal to the cellular network; and a processor, wherein the processor is configured to:

identify multiple uplink carriers which are available for establishing the uplink connection;

receive a request for a measurement report from the cellular network;

in response to the request, measure a transmit power of the mobile terminal for each of the uplink carriers, while the mobile terminal is controlled to have a minimum transmit activity on the uplink carriers, the transmit power being required for performing an uplink transmission on the uplink carrier; and send at least one measurement report indicating the measured transmit powers to the cellular network.

* * * * *